Figure 4:
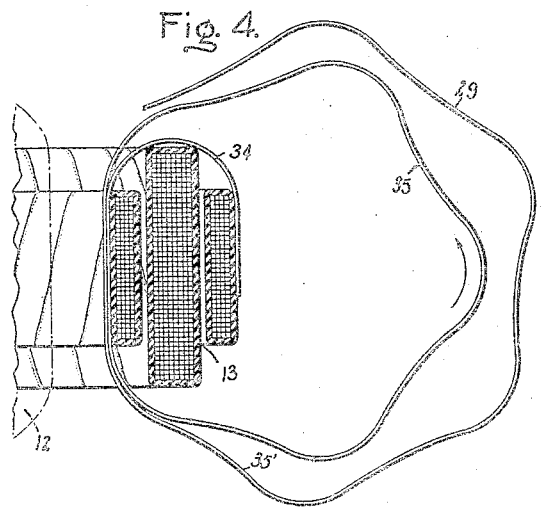

Dec. 22, 1942.  J. J. VIENNEAU  2,305,649
ELECTROMAGNETIC INDUCTION APPARATUS
Filed Feb. 14, 1940  4 Sheets-Sheet 1
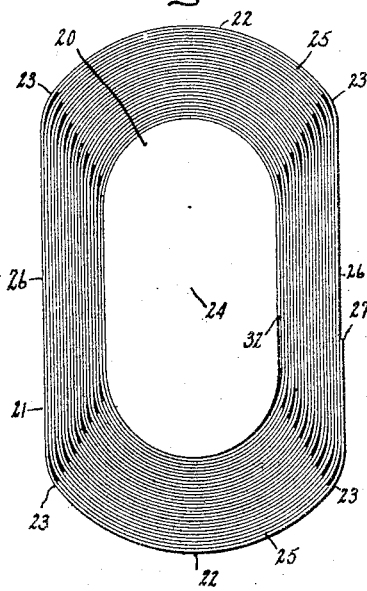
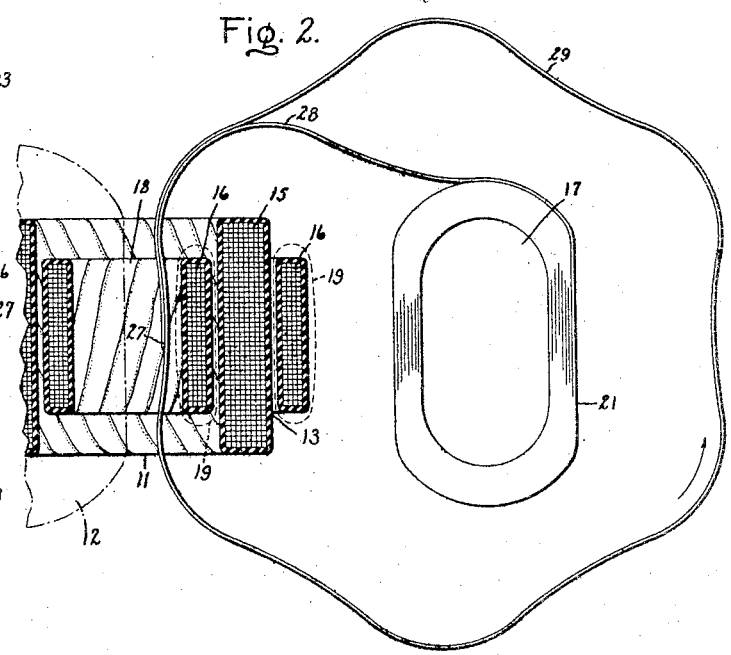
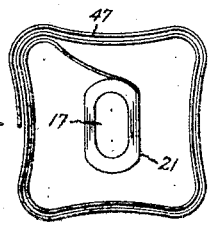
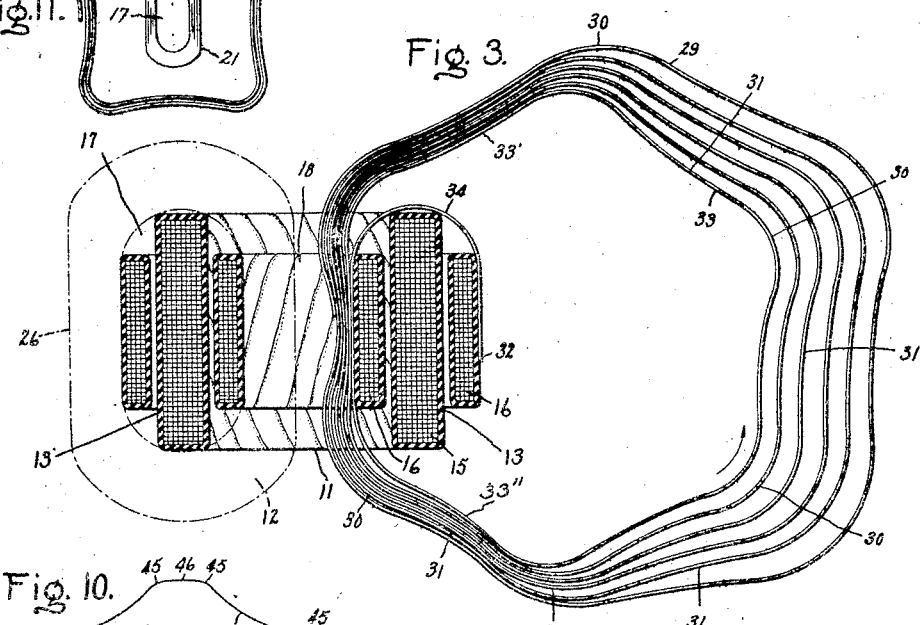
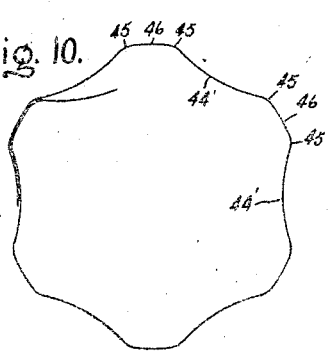
Inventor:
Jacob J. Vienneau,
by Harry E. Dunham
His Attorney.

Inventor:
Jacob J. Vienneau,
by Harry E. Dunham
His Attorney.

Dec. 22, 1942.   J. J. VIENNEAU   2,305,649
ELECTROMAGNETIC INDUCTION APPARATUS
Filed Feb. 14, 1940   4 Sheets—Sheet 3

Inventor:
Jacob J. Vienneau,
by Harry E. Dunham
His Attorney.

Dec. 22, 1942.   J. J. VIENNEAU   2,305,649
ELECTROMAGNETIC INDUCTION APPARATUS
Filed Feb. 14, 1940   4 Sheets-Sheet 4
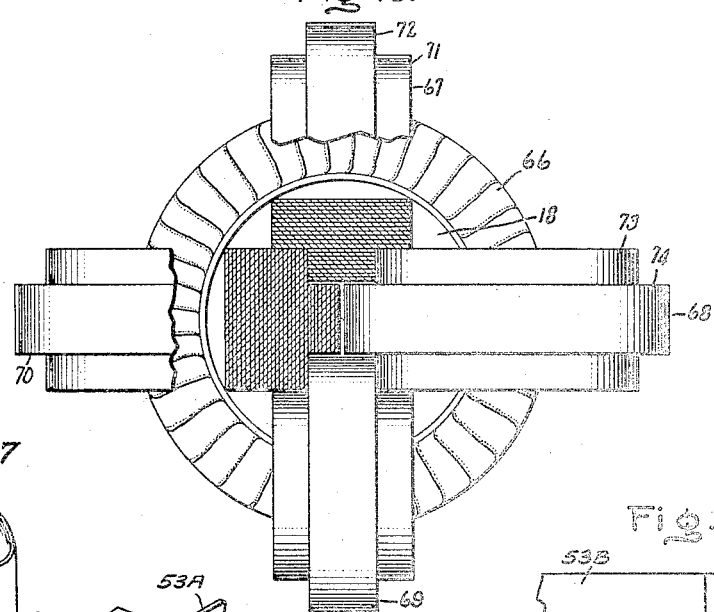
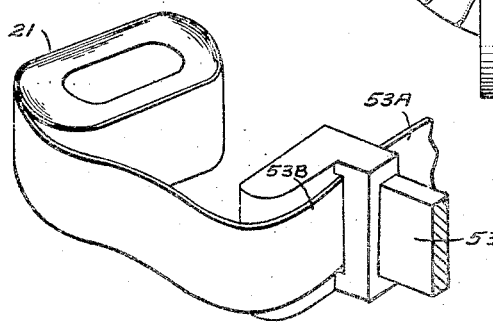
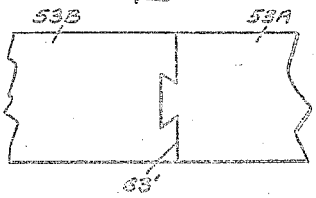
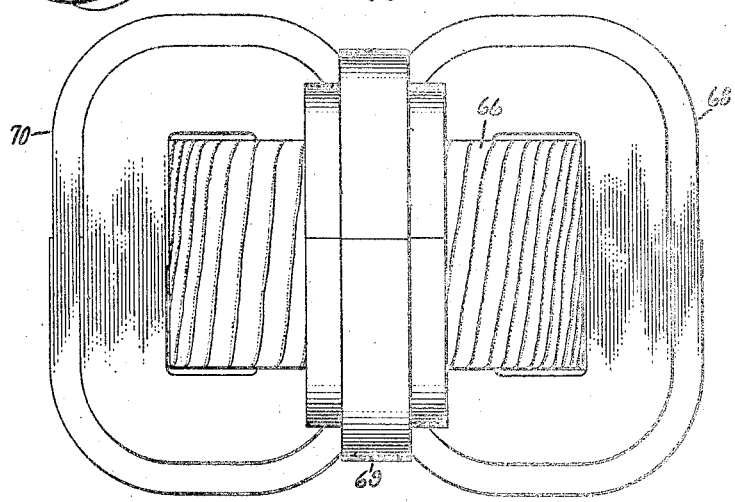
Inventor:
Jacob J. Vienneau,
by Harry E. Dunham
His Attorney.

Patented Dec. 22, 1942

2,305,649

UNITED STATES PATENT OFFICE 2,305,649

ELECTROMAGNETIC INDUCTION APPARATUS

Jacob J. Vienneau, Pittsfield, Mass., assignor to General Electric Company, a corporation of New York Application February 14, 1940, Serial No. 318,868

12 Claims. (Cl. 175—356)

My invention relates to electromagnetic induction apparatus and more particularly to transformers, reactors, and the like with strip-wound magnetic circuits, and methods of making such apparatus.

The current carrying or conductive winding elements of transformers and the like are generally more reliable and otherwise more advantageous when they are preformed and pretreated to improve their insulation before they are assembled with the magnetic circuit or core, as in the case of form-wound coils. Letters Patent to John C. Granfield No. 2,160,588, May 30, 1939, for Electromagnetic induction apparatus and method of making the same, assigned to the assignee of the present application, discloses and claims such apparatus wherein the magnetic members are composed of strip-wound magnetic material which has been heat treated and then operatively linked with such form-wound conductive windings without a permanent alteration in the physical state or magnetic properties developed by the heat treatment. The Granfield construction and method are applicable to a fairly wide range of transformer sizes and are particularly applicable to distribution transformers of small and moderate sizes, which sizes of transformers can be very advantageously and efficiently designed with magnetic cores in the form of substantially circular cylinders and with conductive windings having winding legs of a cross sectional shape adapted to be operatively linked with such circular cylindrical cores with a high space factor.

In some applications and particularly in the larger distribution transformers and in power transformers, such circular cylindrical shapes constitute a handicap to the designer in securing economically the favorable values of reactance or heat dissipation or insulation safety or other characteristic of conventional transformers of the same ratings with laminated cores built up of punchings. Such conventional transformers in the larger sizes, especially those of the so-called concentric type generally preferred for the higher voltages, have their axial sections rectangular with the length of the longer sides several times that of the shorter sides. These shapes and proportions have been developed in the art with long experience in securing certain desirable transformer performance characteristics and reliability, combined with economy. In accordance with my invention for the first time, so far as I am aware, these advantageous features and characteristics can be secured while also securing the great advantage of the wound core arrangement since, in my construction and method of operation, non-circular wound cores are operatively linked with winding legs of an elongated or oblong axial section and closely embrace or fit the winding legs so as to provide a high space factor.

It is a general object of my invention to produce transformers and the like having form-wound conductive winding assemblies with leg cross-sections of an elongated or polygonal shape with any ratio between the lengths of adjacent sides, and having also a strip-wound magnetic core of a noncircular cylindrical shape operatively to link and surround said winding leg with high space factor.

Another object of my invention is to produce transformers of the class described above which will be more efficient than those possible heretofore for the same weight of materials.

If it is attempted to produce transformers of the type described by winding up a core from strip in the shape desired, then heat treating, unwinding, and rewinding it around the conductive winding assembly in accordance with the art developed for circular cores, it will be found that a very slight creepage of the turns of the core beyond or behind (generally behind in non-circular cores) their normal positions, too small to be of any consequence in circular cores, may, by accumulation of such displacement from turn to turn, soon cause the curves, corners and straight portions of later turns to get so far out of alignment with corresponding portions of earlier turns, that the rewinding of the core into its original heat treated form becomes impossible.

It is a principal object of my invention to provide constructional principles and methods which will avoid such difficulties whereby wound heat treated cores having practically any non-circular shape of window can be unwound and rewound into their original forms with great convenience and without resort to excessive force and consequent injury to the insulation of the windings and impairment of magnetic properties of the cores.

One of the important principles of my invention is based on the prevention of accumulation of small unavoidable displacements between successive turns to intolerable misalignments in the course of the winding by providing at frequent intervals a small space between adjacent turns, for a small portion of the turn, sufficient to accommodate those small unavoidable inaccuracies which tend to cause creepage of a turn beyond or behind its normal position.

Figure 6:
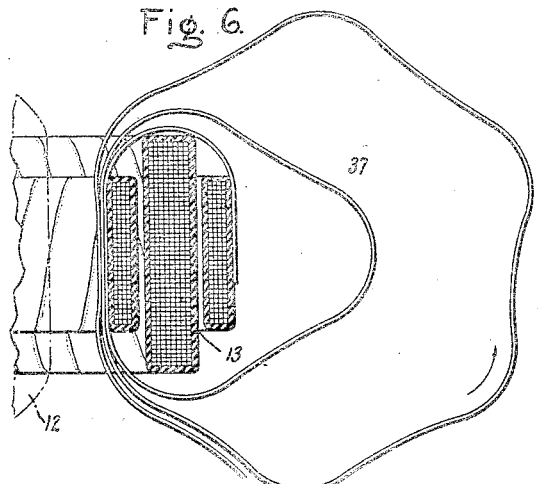
Figure 7:
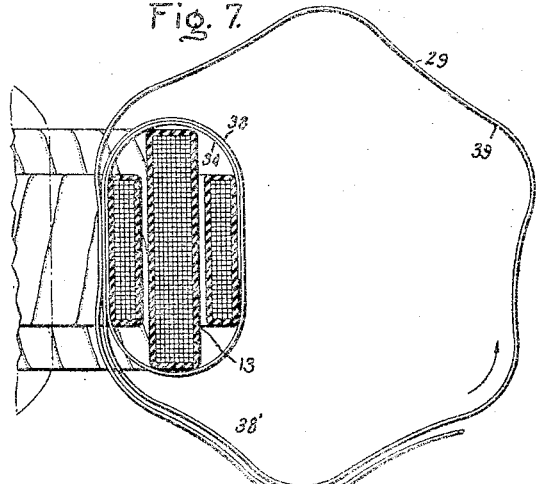
Figure 8:
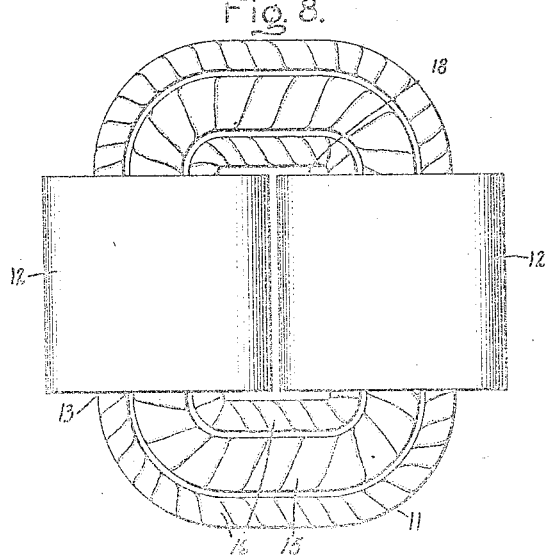
Figure 9:
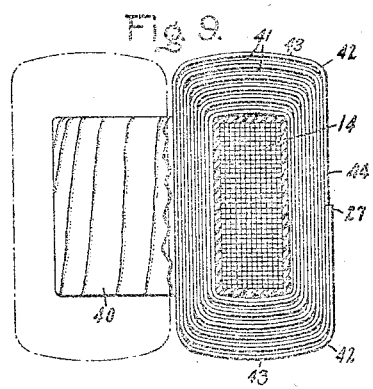
Figure 12:
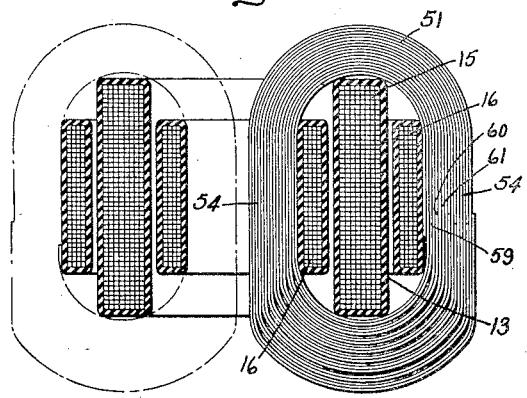
Figure 13:
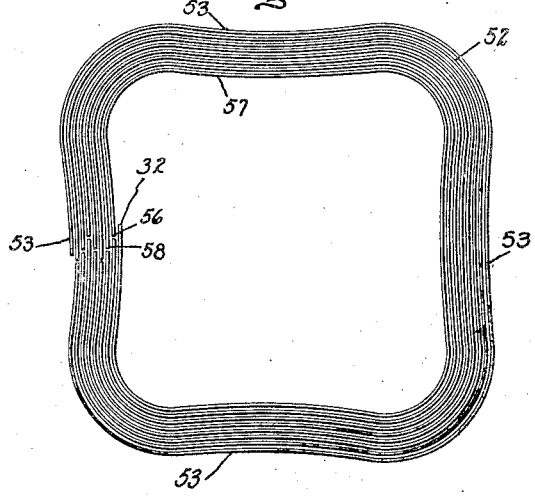
Figure 14:
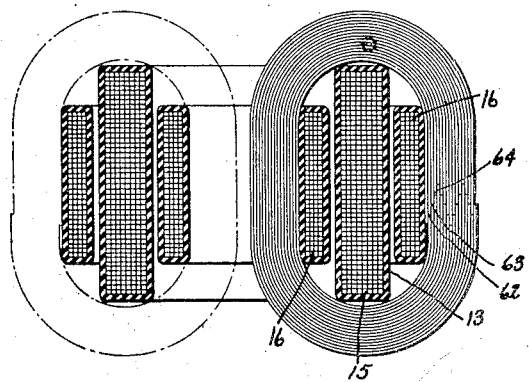

These and other principles, objects and advantages of my invention will be apparent from the following description and claims, and my invention will be more readily understood from such description when considered in connection with the accompanying drawings; and those features of the invention which are believed to be novel and patentable will be pointed out in the claims appended hereto. In the drawings, Fig. 1 is a plan view of a wound-strip core after anneal and ready to be applied to a conductive-winding structure. Fig. 2 is a plan view of a transformer winding structure and of the core material shown in the initial stage of the process of application to the transformer winding structure, the latter being shown partially in section and broken away in part. Fig. 3 is a view corresponding to Fig. 2 but illustrating another more advanced step in the process of applying the core strip to the conductive winding. Figs. 4 to 7, inclusive, are similar views showing still more advanced successive steps in the process, the outer turns of strip of the larger loop of strip being omitted in Figs. 4 to 7 to simplify the drawing. Fig. 8 is an elevation of the completely assembled transformer illustrated in the foregoing figures. Fig. 9 is a plan view partially in section of a modified design of stationary induction apparatus. Fig. 10 is a schematic diagram showing a step in the process of assembling the design of Fig. 9. Fig. 11 is a diagram illustrating a step in a modified process. Fig. 12 is a plan view of a modified core with the conductive winding shown in section. Fig. 13 is a diagram illustrating one step in a modified method of assembly for producing cores, such as illustrated in Fig. 12 and Fig. 14 is a diagram illustrating another embodiment of my invention. Fig. 15 is a plan view partially in section of a modified embodiment of my invention in which the winding legs are curved instead of straight. Fig. 16 is an elevation of the construction represented in Fig. 15. Fig. 17 is a perspective view of a strip severing device which may be used in carrying out one embodiment of my invention, and Fig. 18 is a fragmentary view showing the form of cut which may be made in severing the strip in accordance with one embodiment of my invention. Like reference characters are utilized throughout the drawing to designate like parts.

The apparatus I have illustrated involves certain modifications of the specific constructions illustrated in the aforesaid Letters Patent to Granfield Number 2,160,588, but is designed to obtain the various advantages of the Granfield construction and method of assembly such as low losses, magnetizing current, weight and cost, ability to use low-loss magnetic material such as high reduction cold rolled 3% silicon steel strip, e. g., with the magnetic flux flowing lengthwise, i. e., in the direction of the most favorable magnetic properties of the strip, use of form-wound fully insulated conductive-winding structures, application of the cores to the winding structures in such a manner as to avoid strains above and below the elastic limit, and so forth as discussed more in detail in the Granfield patent.

For the purpose of making the heating in the conductive windings smaller than would be the case in a conductive-winding structure having a substantially circular cross-section I utilize a conductive-winding structure of non-circular cross-section such as square, elongated, rectangular, oval, elliptical or the like as this increases the area of cooling surface of the conductive winding exposed to cooling medium such as air or oil for a given cross-sectional area and weight of conductor material. In Figs. 2 to 8 I have represented a transformer having a conductive-winding structure 11 including the requisite insulation and a magnetic core consisting of a pair of core parts or separate wound cores 12, each wound on a side or leg 13 of the winding structure, the winding leg 13 preferably being straight for the sake of high space factor.

In the following description I shall make reference to transformers by way of illustration, but it will be understood that the invention is applicable as well to reactors. Although the conductive-winding structure 11, that is, the winding legs 13 may have a practically rectangular cross-section, that is, either square or oblong, as illustrated by the section 14 in Fig. 9, in the arrangement of Figs. 1 to 8 I have shown a winding-leg section which, in effect, has the corners rounded off, or the cross-section may be regarded as elongated with rounded ends and straight sides.

The conductive winding structure 11 being for a transformer, of necessity includes primary and secondary windings. It may, for example, consist of a single high tension winding 15 with a pair of low tension windings 16 which, it will be understood, may be connected in series to form an electrically continuous winding. Although in Fig. 8 I have shown a winding structure having two winding legs and including three windings, it will be understood that my invention is not limited to this specific arrangement but obviously includes winding structures comprising one or more windings and having a different number of winding legs than two, for example, such as in the winding structure described in Patent No. 2,221,687 which was granted November 12, 1940, after the filing of my present application, on the copending application of Sidley O. Evans for Transformer assembling method and apparatus, Serial No. 292,173, filed August 28, 1939 and assigned to the same assignee as the present application in which there is a plurality of conductive windings radiating from a core axis with a side of each winding passing through the core to form a winding leg common to all the conductive windings. By making the windings 16 slightly shorter in cross-section than the winding 15, the shape of the ends of the winding-leg section becomes roughly round so as to permit the use of the core 12, having an opening or window 17, the ends of which are rounded so as to simplify the process of shaping the core material by avoiding sharp bends therein. It will be understood that, although for simplicity in the drawings the winding structure 11 is shown as consisting of three apparently mechanically independent windings, in actual practice the windings comprising the winding structure 11 are securely fastened together and may, if desired, have an outer wrapping of insulating tape around all of the windings. It will be apparent that elongated coils or windings forming the winding structure 11 may be braced more easily than would be the case if they were shortened so as to produce substantially circular cross-section. The methods of bracing and securing the winding structure are not a part of my invention and are not peculiar to my construction and may be approximately the same as in transformers having elongated-section conductive windings, but using cores built up of stacked laminations.

In addition to the usual bracing in such conductive winding structure, however, my construction has additional mechanical strength and rigidity resulting from the fact taht the cores 12 closely embrace the conductive-winding legs 13. The winding structure 11 also tends to hold together the cores 12. Furthermore, the construction is highly economical of both copper for the conductive winding, and iron for the core. The space factor is high, the core window 17 being substantially filled by the winding leg 13, and the window 18 of the conductive-winding structure being substantially filled by the material of the cores 12 (see Fig. 8.) Moreover my construction has the advantage of permitting better control of electrical characteristics than ordinary circular-cross-section conductive windings.

The cooling surface of the winding structure 13 is relatively great with respect to its cross-sectional area as the length of the cross-section is about one and one-half times the width of the cross-section. The exact ratio of length to width may, of course, be varied in various designs. In the case of large transformers the high and low tension windings may be spaced, providing channels therebetween for the passage of insulating and cooling fluid. The elongated section of the conductive winding structure also decreases the reactances of the transformer windings 15 and 16 since it increases the length of the flux leakage paths 19, thus increasing their reluctance. Examining Fig. 2, for example, it will be seen that the leakage paths 19 for the low potential windings 16 are relatively long since the flux traverses twice the cross-sectional length of the windings. This gives the transformer lower reactance and results in better regulation. The relatively large heat dissipating surface, of course, gives the transformer good thermal characteristics. The use of a core free from strains above and below the elastic limit and composed of a suitable low loss material, such as high-reduction-cold rolled 3% silicon strip results in low losses, low magnetizing current, and low cost and weight for a given output as compared with a transformer having a core built up with stacked laminations.

To avoid the relatively poor space factor of an elongated-section winding structure with respect to the circumscribed circle, I do not use a wound core having a true circular opening or window, but use a core having an elongated window fitting the winding leg. In order that the core with its elongated window may be applied to the conductive winding structure without straining the magnetic material beyond the elastic limit, certain precautions must be taken. In forming the larger loop mentioned in the Granfield Patent 2,160,588 for the purpose of threading the strip through the window of the conductive winding structure, the portions of strip of approximately the same length and curvature in successive layers of the larger loop are lined up, as represented in Figure 3, and furthermore, in order to avoid binding in collapsing the larger loop to the finished core, the cores are so made that there is a slight degree of looseness or spacing between layers of strip material at the ends or at the corners of the core; but the layers at the long sides are in close contact providing a large contact-surface area, thereby avoiding any interference with the passage of magnetic flux between layers of strip.

In order to obtain the favorable magnetic properties of low-loss magnetic strip having the flux flowing in the direction of the length of the strip, the strip must be arranged in the exact shape and size which the turns of material are to have in the finished core. Heat treatment must, of course, be done before the core is applied to the insulated conductive winding structure. Accordingly, the strip material is first wound upon an arbor 20 having the shape and size which the core window 17 is to have in the finished apparatus, the core window 17 conforming to the outline of the cross-section of the winding leg 13 which includes the insulation of the conductive windings, whereby the core window fits the winding structure and high space factor of the conductive winding material is obtained. In this manner there is built up a spirally wound coil of magnetic strip 21, as shown in Fig. 1. The magnetic strip is wound in such a manner that there is spacing between the turns at one or both of the ends 22 or at the corners 23, or both at the ends 22 and the corners 23. This may be done in any suitable manner such as rotating the arbor 20 about its center 24 as an axis while holding the strip of magnetic material being fed to the arbor perpendicular to the axis and winding in suitable spacing material, or rotating the arbor and deflecting the strip to and fro transversely to the axis of the arbor to ruffle up the strip and introduce spacing crinkles or flutings at the ends 22 or the corners 23 as the strip is deflected back to prevent it from running off the edges of the mandrel axially and forming a conical helix. After the magnetic coil is wound in this latter manner, and before it is annealed, the edges of the various layers of strip may be forced into alignment, and the coil supported with pressure on the sides to cause the spaces to remain at the ends.

Preferably I cause the strip to wind on to the mandrel smoothly by keeping the strip perpendicular to the arbor axis and I provide the spacing by introducing shims 25 between the layers of strip at ends or short sides 22 or at the corners 23, but my invention is not limited thereto and does not exclude using as spacing material continuous strip having a sufficiently low melting point to run out during the heat treatment or loose powder.

The shims 25 may be relatively thin and inserted at each end between adjacent layers of strip. This exact spacing arrangement need not be employed, however, for I have found, for example, as shown in Fig. 1, that satisfactory results may be obtained by separating each pair of layers by a shim from the adjacent pairs of layers of strip, and employing shims 25 of the same thickness as the strip of magnetic material. The shims 25 may in fact be short strips of the same material. I may arrange matters in such a manner that the pair of layers of strip which is close together at one end of the coil 21 is separated by shims at the other end of the coil 21. Although there is spacing between the continuous strip material at the ends and corners 22 and 23, it will be apparent that the successive layers of strip are in close contact all along the sides 26 of the coil 21. To minimize the possibility of strain in heavy cores it is advantageous to make the cores with the turns spaced at one end only. In this case the weight of the core and coils together may rest and be supported on the end of the core that has no space between turns.

After the coil 21 of the form shown in Fig. 1 has been suitably heat treated to bring out its desirable magnetic properties and to give it a permanent set, the material having cooled, the strip may be applied to the conductive winding structure. The outer layers of coil 21 are unwound passing the end 27 of the strip through the winding window 18 (Fig. 2) and bringing it back upon the next adjacent lower layer of strip 28 to form a larger loop 29, surrounding both the winding leg 13 and the original coil of strip 21. It will be advantageous to secure the end 27 of the strip to the next lower layer of strip in some suitable manner as by means of spot welding. The larger loop 29 and the coil of strip 21 are rotated so as to pass more and more of the material through the conductive winding window 18, transferring it from the outside of the coil 21 to the inside of the larger loop 29. The formation of the larger loop permits transference of the material without exceeding the elastic limit of the material or producing any permanent deleterious effects upon its properties. Throughout the assembling process care is taken to avoid excessive bending or jarring of the strip.

In forming the first turn of the larger loop 29 and fastening its end 27, it is not enough merely to make the loop sufficiently large to enclose the core and winding leg with ease. It is a principle of the present invention that each turn of the loop include a whole number of sides of the original turns and a whole number of ends or curved portions of the original turns, in order that successive turns of the larger loop can be formed so as to line up long straight sides of original turns with each other and the curved portions of the original turns with each other in the successive turns of that larger loop. For example, as seen in Fig. 3, portions of relatively short length and short radius of curvature, such as the portions 30, are lined up along one another, and substantially straight portions 31 are also lined up along one another. It will be observed that the curved portions 30 are those portions of the strip which were originally at the ends 22 of the coil 21 of Figs. 1 and 2, and that the portions 31 which are very nearly straight or have a slight opposite curvature from that of 30 are those portions which were formerly at the straight sides 26 of the original coil 21. The larger loop 29 should be of sufficient size to permit surrounding the winding leg 13 and the original coil 21 without crowding, while the unwinding and simultaneously rewinding operation is going on. Likewise the difference in size between the original coil 21 and the larger loop 29 should also be sufficiently great so that when all of the material has been transferred to the larger loop 29, there will be few enough layers of strip in the winding window 18 so that they can be passed through one-half the winding window without binding upon the conductive winding, assuming that the construction is one in which there are two separate cores 12, for which one of the cores 12 already in place there would, of course, be only one-half winding window available for the larger loop 29. Lining up the adjacent layers of strip portions 30 and 31 of similar length and radius of curvature respectively permits making the portion of the loop 29 within the winding window 18 sufficiently compact for passing through the winding window. Although my invention is not limited to making the larger loops 29 of the specific size shown in relation to the original coil 21, I have found it satisfactory to make the length of the strip in each turn of the larger loop 29 three times that in each turn of the original coil 21, thus forming a six-sided or hexagonal figure in which each "angle" is one of the short-radius curved portions 30.

After all of the strip material has been transferred to the larger loop 29, the inner end 32 of the strip is released and permitted to wrap itself around the winding leg 13. If the strip was wound around the arbor 20 with the inner end 32 coming at the middle of one of the long sides of the window 17, and the end 32 is released when the larger loop is in the position shown in Fig. 3, the strip wraps itself about halfway around the winding leg as shown in Fig. 3. Owing to the permanent set of the strip material the inner end of the larger loop 29 tends to hold itself against the winding leg 13. However, if desired, the end 32 may be secured to the winding structure 13 in any suitable manner. The next step in the process is collapsing the larger loop 29 upon the winding leg 13. However, all turns of the larger loop 29 are not collapsed simultaneously, but instead, the loops are collapsed successively beginning with the inside loop. The strip is manipulated with sufficient gentleness to avoid stretching or bending any part of it beyond the elastic limit. The manner in which the strip is arranged in the loops makes the proper manipulation a relatively easy matter.

During the collapsing process, all of the turns of the larger loop 29, with the exception of the turn which is the inner turn at the time, for example, turn 33 in Fig. 3, are held together and are rotated together as a unit; and the forward portion 33' of the inner turn 33 is allowed to slip about the initial one-half turn 34 which is already wrapped around the winding leg 13, to permit the backward portion 33'' of turn 33 to wrap itself around 34. It will be evident that in so doing the inner turn 33 will be shortened, and whereas its original length was three times the length of the turn in the original coil 21, that is to say, the layer 33 actually consisted of three layers of the original coil 21, the length will be reduced successively to various smaller whole number of times the length of a half-turn of the original loop 21. In the illustrative example shown, the inner layer 33 of the "hexagonal" loop 29 has six "angles" or short-radius curved portions 30. However, after one of these "angles" has been slipped by the winding leg 13, the inner layer 33 of the larger loop 29 will consist of only five sides and "angles" and the length of the layer 33 will be only two and one-half times the length of a layer or turn in the original coil 21, as represented by the "pentagonal" inner turn 35, in Fig. 4, in which only the inner turns of the larger loop are shown for simplicity. The turn 35 contains a whole number of times the length of the material in a half turn of the original coil 25, that is, five times. It will be understood that in Figs. 4–7, inclusive, the outer portions of the larger loop 29 have been omitted for the sake of avoiding unnecessary confusion in the drawings.

Figure 5:
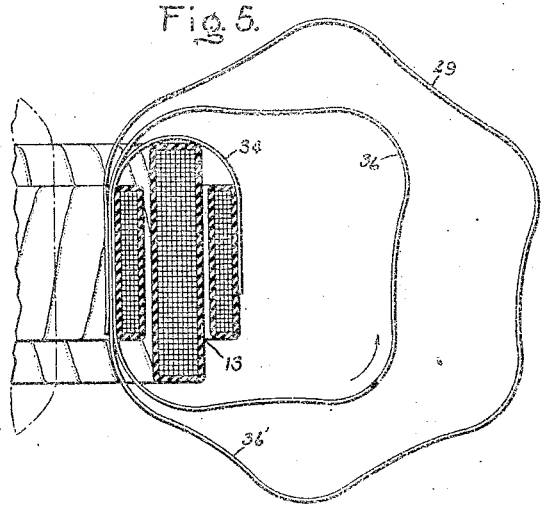

After the larger loop 29 has been rotated sufficiently to cause another part or side of the polygonal inner layer 33 to slip by the inner half turn 34 on the winding leg 13, the former inner layer 33 would have only four "angles," as represented at 36 in Fig. 5, and its length would be reduced to four times one-half an original turn. As shown in Fig. 6, the next step is the reduction of the inner layer 33 to a length 37 containing three "angles," and three times the length of one-half turn in the original coil. As shown in Fig. 7, after one more "angle" of the former inner turn 33 has been slipped around the inner half turn 34 of the final core, the inner layer 33 will have disappeared as such, and a portion of it will have become an additional small turn 38 surrounding the initial half turn 34 on the winding leg 13.

More accurately speaking, a portion of the inner layer 33 of Fig. 3 becomes the inner layer 35 of Fig. 4, and the rest of it corresponding to distance between "angles" becomes a portion 35' of the next layer of the larger loop 29. In a similar manner, a portion of the inner layer 35 becomes the smaller inner layer 36 of Fig. 5, with the portion 36' formerly in the layer 35 being left over to form a portion of the next layer of the larger loop 29. Likewise, a portion of the inner layer 36 becomes the inner layer 37 of Fig. 6 with a portion left over, and a portion of the inner layer 37 becomes the smaller turn 38 of Fig. 7, whereas a portion 38', left over, becomes a part of a new inner layer 39.

After the first portion of the former inner layer 33 of the larger loop 29 of Fig. 3 has become the small turn 38 of Fig. 7 and the remainder with additional material from the next layer of the larger loop 29 has become a new inner layer 39, as shown in Fig. 7, the procedure represented by Figs. 3 to 7 is repeated. The rotation of the larger loop 29 is continued with all layers of the larger loop held together except the new inner layer 39, which is allowed to slip around the small turns 34 and 38 of the winding leg 13, in the same manner as described in connection with the inner layer 33 in Fig. 3. In this manner additional turns are wrapped about the winding leg 13 by successively collapsing only the inner layer of the larger loop 29 until all of the layers of the larger loop have been collapsed and all of the material of the larger loop has been reduced to its original size and shape with its original spiral configuration to form the finished core 12, as illustrated in Fig. 8.

It will be apparent that as the material of the original coil 21 (Fig. 2) is unwound and rewound into the larger loop 29, the shims 25 will fall out and the finished cores 12 will be identical with the original coil 21, shown in Fig. 1, with the exception that there are no shims therein. The finished cores 12 have straight sides 26, such as the original coil of strip 21, and the layers of strip will be in close contact at, and all along the sides 26. Consequently, the core 12 produces a continuous path for magnetic flux with the flux gradually passing from one layer of strip to the next through contact surfaces of large cross-sectional area at the straight sides 26 of the core. Preferably the outer end 27 of the strip, indicated at Fig. 1, is fastened down to the next adjacent strip in the finished cores 12 in some suitable manner as by spot welding.

The cores 12 have thus far been described as each being composed of a single continuous strip of magnetic material, but of course a core may comprise one or more separate core elements, each made up of a continuous strip and arranged end to end or one around the other on the same winding leg.

Although in the foregoing figures and in the explanation, I have shown and referred to the magnetic core as having a window with rounded ends, it will be understood that my invention is not limited thereto, and if there is a conductive winding structure 40 such as shown in Fig. 9 with an oblong section 14, the process may be carried out in a similar manner as before by use of shims placed at the short sides or ends or placed at the corners of the original coil of strip so as to leave spaces 41, to avoid binding in the rewinding and collapsing operations. The turns of the larger loop formed when applying an elongated rectangular hollow cylindrical core, such as that of Fig. 9, will be similar in shape to those shown in Figs. 2 to 7, inclusive, with the exception that the curved portions 30 of Fig. 3 will be replaced by pairs of "angles" 45 and short, relatively straight, portions 46 (Fig. 10) corresponding to the corners 42 and the short sides or ends 43 respectively of the core of Fig. 9. The long sides 44 of the core in Fig. 9 correspond to the concave portions 44' in Fig. 10. Each of said pairs of "angles" will correspond to the "angles" or curved portions of short radius of curvature referred to in the explanation involving Figs. 3 to 7, inclusive. Similarly, with a conductive winding structure of square cross-section the larger loops would have "angles" corresponding in number to the number of corners 42, equally spaced and separated by relatively straight portions corresponding to shorter sides or ends 43 and sides 44 of the original coil of strip of the unfinished core. In carrying out my process, the corners 42 open partially and the straight sides 44 become partially concave to form the larger loop without exceeding the elastic limit of the material. In the case of such square cross-section conductive windings, the lengths of turns in the "larger loop" might, of course, be a whole number of times one-fourth the length of a turn of the original coil of strip without interfering with alignment of the portions of approximately equal curvature in adjacent turns of the "larger loop." Portions of strip of similar shape and size are repeated four times in each turn of the original coil of strip in the case of the aforesaid cores for square cross-section windings. Likewise portions of strip of similar size and shape are repeated twice in each turn of the original coil of strip used in the elongated constructions illustrated in Figs. 1 and 9, e. g. Such similar repeated fourths and halves of a turn of the original coil of strip may be referred to as "aliquot fractions" of a turn of the original coil of strip. In forming the "larger loop," each turn of the "larger loop" must contain a whole number of times such an aliquot fraction of a turn of the original coil of strip in order that the portions of strip of approximately equal curvature in adjacent turns of the "larger loop" will be in alignment. In using the term "aliquot fraction," I mean to include also unity or a single turn, for in the case of a D-shaped original coil of strip, e. g., each turn of the "larger loop" will need to contain a whole number of turns of the original coil of strip.

In connection with Figs. 2 to 7, I have described in detail a method of applying a core to a conductive winding structure which involves unwinding a heat treated coil of strip 21 and simultaneously rewinding it into a larger loop 29 linking the conductive winding structure. If the process is to be carried out by machine it may be more convenient first to rewind the strip into an intermediate loop of greater size than the core but less size than the "larger loop" which will be linked with the winding structure. For example I may rewind the coil 21 into a three- or four-sided figure such as the loop 47 indicated schematically in Fig. 11, where each turn of the loop 47 is represented as containing four half-turns of the coil 21. After the intermediate loop 47 is formed it may be held to its size by a mandrel which is free to rotate and rewound into a larger loop linking the conductive winding structure as previously explained in connection with the transformation of the coil 21 into the larger loop 29. However, the "larger loop" in this case would preferably be larger than the larger loop 29 owing to the fact that the intermediate loop 47 is larger than the coil 21 and such larger loop may if desired be longer than it is wide without at any point exceeding the elastic limit. The larger loop is collapsed upon the conductive winding leg in the manner previously explained, the mandrel having been removed.

While magnetic core elements as heretofore described consisting of a considerable number of turns of continuous strip can be assembled on the conductive windings, either manually or by machine, the assembly by hand may be carried out more easily and quickly where the magnetic cores are composed of a relatively large number of core elements or sections, each core element surrounding the preceding core element and each consisting of a small number of turns. With relatively few turns of continuous strip material in each core element, the operation of assembly may be performed quickly and easily manually by a single operator. This construction will be described in connection with Figs. 12, 13 and 14.

A strip of material is first wound to form a coil of strip in which the successive turns of strip have the shape and size which they are to have in the finished core, as already explained in connection with the cores shown in Figs. 1 and 9. The requisite spacings between turns may be provided by means of shims at both ends, as shown at Fig. 1, or by means of shims at only one end in order to have the spacings at only one end, as illustrated in Fig. 12. The strip so wound is then subjected to suitable heat treatment to bring out its desirable magnetic properties and relieve the material of strains, causing it to acquire a permanent set and tending to retain the turns of strip in the shape in which they were heat treated. The coil of strip is then opened up or unwound to form a larger loop a few times the peripheral size of the original coil of strip, as discussed in connection with Figs. 11 and 2, the strip not being wound into the winding structure, however, as shown in Fig. 2. The actual relationship between the length of the turns of strip in the coil 51 of Fig. 12 and the perimeter of the loop may be selected at any one of several values, for example, with the perimeter of the larger loop twice, 2½ times, 3 times, 3½ times, etc., as large as the original coil of strip. In Fig. 13 is illustrated the larger loop formed by unwinding the coil 51 into what I call a four-sided figure, that is, with the perimeter of the loop 52 twice as great as the perimeter of a turn of strip in the coil 51. This is referred to as a four-sided figure for the reason that it has four relatively long sides 53 corresponding to the long sides 54 of the turns in the coil of strip 51.

The successive large turns in the larger loop are then cut out beginning at the inside. For example, first a cut is made at the point 56 separating the inner large turn 57. This large turn 57 is applied to the winding leg by opening up the large turn sufficiently to admit the winding leg, whereupon the end 32 is laid against the winding leg 13, as in Fig. 3, after which the permanent set of the material causes the rest of the large turn 57 to wrap itself around the winding leg, as illustrated by the portion of the strip 34—38 in Fig. 7. In this case, however, the core element applied consists of only two turns, because the large turn 57 consists of the two inner turns of the original coil of strip which was of the same size as the finished coil 51. The same operation is then repeated, another cut being made at 58 to permit the next two turns of core element to be removed from the larger loop 52 and applied to the conductive-winding leg around the core element which has just been applied. These operations are carried out until all of the strip material has been applied to the conductive winding leg to form a finished core, such as the core 51 of Fig. 12 linking the conductive winding and consisting of a plurality of core elements each composed of two turns of continuous magnetic strip material.

If the locations of the successive cuts 56, 58, etc., are slightly staggered it will be apparent that the breaks 59, 60, 61, etc., between the successive two-turn core elements will also be staggered. However, even without such staggering, good magnetic conditions can be obtained in the finished apparatus for the reason that the bridging of a break by an adjacent unbroken portion of strip in close contact with the ends of strip terminating at the break results in low-reluctance magnetic paths, from one core element to the next. It will be observed that the successive core elements are so applied that the strip ends formed by the cuts 56, 58, etc., in Fig. 13 are in abutment in the finished core 51 forming the breaks 59, 60, 61, etc., as shown in Fig. 12. It is not necessary to make the cuts 56, 58, etc. accurately at any particular portion of the strip, nor is it necessary that the cuts should be made exactly square or at any particular angle. Regardless of the position or angle at which the cuts are made the strip ends fit each other and form a close butt joint in the finished core 51. If desired, a suitable stripsevering shear or punch as illustrated in Fig. 17 may be employed which produces a triangular, irregular or even dovetailed shaped cut so as to produce interlocking between the adjacent strip ends. A dovetail cut, for example, is illustrated in Fig. 18, in which 63' illustrates the cutting line or joint after adjacent ends of consecutive lengths of strip 53A and 53B have been reassembled in interfitting relation. In Fig. 17 the original coil of strip 21 is shown with a portion of the strip material withdrawn and inserted between the cutting blades or elements of a strip severing device 53C. Only the front blade or cutter of the strip severing device 53C is visible, and it is shown in position to sever the length of strip 53A from the length of strip 53B shown still attached to the original coil of strip 21. Burrs should be avoided at the cut edges and, while the cutting or shearing operation will strain the metal at the edges of the cuts somewhat, the total losses due to these strains will be relatively small if the operation is carefully performed since these edges represent such a small fraction of the total iron in the core.

An alternative procedure in preparing the heat-treated coil of strip for assembling around the conductive winding leg in relatively shorter lengths, is to unwind the heat-treated coil of strip starting with its outside turn and cut pieces of desired length successively as the unwinding progresses. These pieces or lengths of strips may be nested together, if economy of working space is desired while these core elements are being cut. When the last core element or length of strip is made ready, it is assembled around the winding leg, and the rest of the core elements are assembled in their proper sequence around the winding leg restoring them to their original size, shape and relative position in the heat-treated coil.

The cores shown in Fig. 12 may safely be supported by the conductive-winding structure without fear of distorting the magnetic material. If the weight of both core and conductive winding is to rest on the core, the arrangement of Fig. 12 is, of course, turned around so as to make the ends 51 the bottom.

In applying the strip to the core by cutting into relatively small sections or core elements it is possible to use sections containing less than two turns of strip, e. g. only one turn as shown in Fig. 14, or even fraction of a turn. However, care should then be taken to stagger the cuts 62, 63, 64, etc. and even by staggering the cuts less favorable magnetizing current is to be expected than when using a multi-turn core element. On the other hand using single-turn sections further simplifies the assembling operation as the larger loop 52 need not be formed. It will be understood that in all of the forms of my invention which I have described, the turns are put on the winding leg in the same order they had in the annealed coil. Consequently the turns of strip in the assembled induction apparatus are in the same relative position as in the coil when annealed. They have their original size and shape and are substantially strain free, not being distorted even by the thickness of a layer of strip, which has been found to be of great importance in obtaining low magnetic losses. Thus high permeability and low watt-loss characteristics of the cores can be obtained.

Although a higher space factor within the core window can be obtained, especially in the case of cores wound from wide strips, by using conductive winding structures having straight winding legs than by using circular-window conductive windings having curved winding legs, it will be understood that my invention is not limited to using straight winding legs. In the construction illustrated in Fig. 15 the winding structure 66 has a circular window 18 for receiving the core and the core section is made cruciform or with a stepped outline for the sake of preserving a relatively high space factor within the window of the winding structure. The winding structure 66 has an annular projection on a plane perpendicular to its axis. However, the longitudinal sections cut by planes through its axis are rectangular, as in the case of the arrangement of Fig. 9. The core is divided into a number of parts with interfitting cross-section in order to increase the space factor. In the arrangement illustrated there are four radially-extending angularly-spaced core parts 67, 68, 69 and 70 each of which includes core elements of different width. The part 67 consists of a relatively wide core division 71 and a narrower core division 72, each of which may comprise a continuous strip of magnetic material forming a single core element, or may consist of a plurality of strips forming separate core elements, each core element surrounding the preceding element, such as the core elements described in connection with the preceding figures. The core division 71 is surrounded by the narrower core division 72 and if desired the strip of the core division 72 may be continuous with the strip in the core division 71.

The core part 68 likewise is composed of a relatively wide core division 73 surrounded by a narrower core division 74. The core parts 67 and 69 are similar, and core parts 68 and 70 are also similar with the relative widths and depths of the core divisions so selected that the cross-sections of the four core parts 68 to 70 fit one another and produce a stepped outline filling most of the space within the conductive winding window 18.

I have herein shown and particularly described certain embodiments of my invention and certain methods of operation embraced therein for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States, is:

1. Electromagnetic induction apparatus comprising a conductive winding structure having a winding leg with elongated cross-section and a magnetic core including a core element comprising a continuous strip of magnetic material spirally wound flatwise about the winding leg and closely embracing it, the successive layers of strip at the sides of the core element lying closely against one another but turns at the ends of the core having spacings to avoid binding in assembling the core with the winding leg.

2. Electromagnetic induction apparatus comprising a conductive-winding structure having a winding leg with rectangular cross-section and a core element comprising a continuous strip of magnetic material, spirally wound flatwise about the winding leg and closely embracing it, the successive layers of strip lying closely against one another along one side of said core, but some of the turns at another side of the core having spacings to avoid binding in assembling the core with the winding leg.

3. Electromagnetic induction apparatus comprising a conductive-winding structure having a winding leg with non-circular cross-section and a magnetic core comprising a continuous strip of magnetic material spirally wound flat-wise about the winding leg and having a window substantially the same in shape and size as the winding leg cross-section, the successive layers of strip on at least one side of the core lying closely against one another along the said side, but the turns at some other portion of the core having spacings to avoid binding in assembling the core with the winding leg.

4. Electromagnetic induction apparatus comprising a conductive winding structure having a winding leg with elongated cross-section, and a magnetic core comprising a core element of continuous magnetic strip material spirally wound flatwise about the winding leg and closely embracing it, the successive layers of strip at the sides of the core lying closely against one another but the turns at one end of the core having spacings to avoid binding in assembling the core with the winding leg.

5. Electromagnetic induction apparatus comprising a conductive winding structure having a winding leg with a non-circular cross-section and a magnetic core consisting of magnetic strip material passing through the window in the conductive winding structure and substantially filling it to provide a high space factor, said magnetic core comprising a core element consisting of a continuous strip of magnetic material spirally wound flatwise about the winding leg, and having a window substantially the same in shape and size as the winding leg cross-section, the successive layers of strip of the said magnetic core element lying closely against one another along the flux path within the window of the conductive winding structure, but the layers at a portion of the core element having spacings to avoid binding in assembling the core element with the winding leg.

6. Electromagnetic induction apparatus comprising a conductive winding structure having a winding leg with a non-circular cross-section and a magnetic core comprising many layers of magnetic strip material passing through the window in the conductive winding structure and having a non-circular window therein, said magnetic strip material extending spirally flatwise about the winding leg, and the successive layers of strip lying against one another in close surface contact along a substantial portion of the peripheries of each turn of strip to minimize the air gap effect in said apparatus, lying in looser contact along another portion of the peripheries of the turns of strip to facilitate assembling the core with the winding leg, the strip material being substantially free from strains deleterious to its magnetic properties and having a permanent set to retain its operative configuration substantially without constraint.

7. An electromagnetic induction apparatus comprising a conductive winding of the form-wound type having a winding leg of non-circular cross-section, and a magnetic core element of coiled strip having an oblong window and operatively linking and closely embracing said winding leg with high space factor, said coiled strip being substantially free from strains deleterious to its magnetic properties and having substantially those improved magnetic properties which are characteristic of such strip consequent to heat treatment, the turns of said coiled strip making close surface contact with each other along a side of said window to minimize air-gap effect in the magnetizing current of said apparatus and looser contact along another side thereof to facilitate rewinding of said coiled strip into its operating form after unwinding.

8. An electromagnetic induction apparatus comprising a conductive winding of the form-wound type having a winding leg of non-circular cross-section, and a magnetic core element having a non-circular window and operatively linking and closely embracing said winding leg with high space factor, said core element including a plurality of lengths of magnetic strip disposed in said core and wound flatwise consecutively over each other in a spiral configuration around an axis normal to the plane of said window, with the starting end of one length of strip fitting and being in butt-jointed relationship to the finishing end of the preceding length of strip, each length of strip having a permanent set to retain its operative configuration in said core substantially without constraint and exhibiting substantially those improved magnetic properties which are characteristic of such strip consequent to heat treatment, the joints formed by said length of strip being staggered to minimize the magnetizing current of said apparatus.

9. An electromagnetic induction apparatus comprising a conductive winding of the form-wound type having a winding leg of non-circular cross-section, and a coiled magnetic core element having an oblong window operatively linking and closely embracing said winding leg with high space factor, said coiled core element including a plurality of magnetic strips wound flatwise consecutively over each other end to end in turns of oblong configuration, the finishing end of one strip and the starting end of the succeeding strip being substantially in butt-jointed relationship, the turns of said core including a plurality of said butt joints on a side in staggered arrangement and being in close contact with each other on that side to minimize the gap effect in the magnetizing current of said apparatus, and being substantially free from joints on another side and in looser contact with each other on that side to facilitate assembly of said core into its operating form.

10. An electromagnetic induction apparatus comprising a conductive-winding structure having a winding leg of non-circular cross-section, and a coiled-strip magnetic core element having a non-circular window and operatively linking said winding structure, said core element comprising a plurality of pieces of the same strip of magnetic material, said pieces being positioned in said core element as consecutive portions of a non-circular spiral, with the starting end of one piece, therefore, fitting and in butt-jointed relationship to the finishing end of the preceding piece, said strip material being substantially free from strains deleterious to the magnetic properties and having a permanent set in each portion thereof to retain the operative configuration of the pieces with close surface contact between adjacent layers of strip along the jointed sides of the turns of strip, the joints being staggered to minimize the magnetizing current of the apparatus.

11. An electromagnetic induction apparatus comprising a conductive winding of the form-wound type having a winding leg of non-circular cross-section, and a magnetic core element having a non-circular window and operatively linking and closely embracing said winding leg with high space factor, said core element including a plurality of pieces of magnetic strip disposed in said core wound flatwise consecutively over each other in a non-circular spiral around an axis normal to the plane of said window and free from adhesions between adjacent layers of strip, with the starting end of one piece of strip fitting and being in butt-jointed relationship to the finishing end of the preceding piece of strip, each piece of strip having a permanent set to retain its operating configuration in said core substantially without constraint and exhibiting substantially those improved magnetic properties which are characteristic of such strip consequent to heat treatment, the joints formed by said pieces of strip being spaced so that each joint is in surface contact with an unbroken portion of an adjacent layer of strip.

12. Electromagnetic induction apparatus comprising a conductive winding structure having a winding leg with elongated cross-section, and a substantially strain-free magnetic core comprising a plurality of pieces of magnetic strip wound flatwise about the winding leg and closely embracing it with high space factor with the starting end of one piece of strip fitting and interlocked with the finishing end of the preceding piece of strip.

JACOB J. VIENNEAU.